United States Patent [19]
Irick

[11] 3,783,443
[45] Jan. 1, 1974

[54] EJECTABLE UNDERWATER SOUND SOURCE RECOVERY ASSEMBLY

[75] Inventor: Stephen C. Irick, Hampton, Va.

[73] Assignee: The United States of America as represented by the Administrator of the National Aeronautics and Space Administration, Washington, D.C.

[22] Filed: July 19, 1972

[21] Appl. No.: 273,240

[52] U.S. Cl. .............. 340/5 R, 340/8 R, 340/12 R
[51] Int. Cl. ........................................... H04b 11/00
[58] Field of Search................... 340/2, 3 A, 4 R, 340/5 R, 6 R, 8 R, 10, 12 R, 9

[56] References Cited
UNITED STATES PATENTS
3,005,187  10/1961  Mayes............................... 340/6 R
3,249,913  5/1966  Smyth et al.......................... 340/10

Primary Examiner—Richard A. Farley
Attorney—Howard J. Osborn et al.

[57] ABSTRACT

For ejectable mounting on a mobile device (e.g., a rocket) intended to travel over water to facilitate location and recovery of the device when submerged, an underwater sound source is mounted in a mounting bracket which is attachable to the device so as to detach or eject upon impact, destruction, or automatically at a prescribed time or under prescribed conditions. Preferred attachment means for some uses comprise bolts which are adapted to fracture upon impact with the water. A length of flexible line is coiled within a line housing coupled to the mounting bracket such that the line will freely feed out from the housing when pulled by one free end thereof, which free end is adapted for coupling with the device, the other end being coupled with the sound source and its bracket. This allows ejection of the bracket with the sound source, while maintaining a flexible connection between the mobile device and the sound source. An aerodynamic fairing which provides a clean aerodynamic surface during flight is adapted to separate from the bracket upon ejection from the mobile device. During recovery, the sound source is located by a diver, and the line leads to the device, which may be a rocket buried in mud on the ocean floor.

11 Claims, 3 Drawing Figures

PATENTED JAN 1 1974 3,783,443

EJECTABLE UNDERWATER SOUND SOURCE RECOVERY ASSEMBLY

ORIGIN OF INVENTION

The invention described herein was made by an employee of the United States Government and may be manufactured and used by or for the Government for governmental purposes without the payment of any royalties thereon or therefor.

FIELD OF THE INVENTION

This invention relates to ejectable underwater sound source recovery assemblies, that is, underwater sound source assemblies that are ejectably mounted on rockets, aircraft, watercraft, precious cargo, or any mobile device that may travel over water, to facilitate location and recovery of the device when submerged. In its preferred embodiment and use, the invention is particularly useful in the recovery of spent rocket motors that bury in the ocean floor upon impact.

BACKGROUND AND SUMMARY

Location and recovery of objects and devices from the floor of a body of water, such as the ocean floor, is often extremely difficult because of the conditions involved. For instance, such objects may bury themselves in mud on the ocean floor. Even if not buried, they may be in a muddy or murky area where a diver's visibility is extremely limited, either because of the natural murkiness or because of the mud and murkiness stirred up by the diver moving around in the area. Location and recovery of such objects can be facilitated somewhat if they include an underwater sound source which can be detected by a diver. However, difficulties are encountered even when such sound sources are used. For instance, if the object to be recovered was originally airborne, the sound source may be damaged or destroyed when the object initially impacts with the water surface. If the object was originally airborne or surface borne, the sound source may be crushed during the impact of the object with the ocean floor. Even if the sound source is not damaged or crushed, its effectiveness will be substantially reduced if the object and the sound source bury deeply in the ocean floor. Finally, even if the object and the sound source settle on the ocean floor with the sound source undamaged, there still remains a problem in the final pinpointing and locating of the object by the diver, because of the fact that the diver's ability to detect the direction of the sound source diminishes as the diver approaches the sound source. Thus, the diver may home in on the sound source so as to place himself in the general area of the object to be recovered, but since his ability to sense the direction of the sound source is now substantially diminished, there may be substantial further delays in actually locating the object, and the diver may compound the delays by stirring up the floor in the area of the object and contributing to the murkiness in the area so as to limit his visibility. In fact, in the end the diver may be forced to locate the object simply by feel.

With the foregoing in mind, it is an object of this invention to provide an underwater sound source assembly that may be ejectably mounted on rockets, aircraft, watercraft, precious cargo, or other such devices, to facilitate location and recovery of the device when submerged. It is a more particular object of this invention to provide such an assembly which is attachable to the object or device so as to detach or eject upon impact, destruction or automatically at a prescribed time or under prescribed conditions. It is still a further object of this invention to provide such an assembly which will not be damaged upon impact or crushed upon settling on the ocean floor, which will be located away from the object to be recovered but will be connected thereto by a flexible line, and which will facilitate locating the object after the diver reaches the general area even though his visibility may be substantially limited.

In general, my invention utilizes a conventional underwater sound source, modified with an attachment point for receiving one end of a flexible line. The sound source is mounted in a mounting bracket which is attachable to the device so as to detach or eject upon impact, destruction, or automatically at a prescribed time or under prescribed conditions. Preferred attachment means for some uses comprise bolts which are adapted to fracture upon impact with the water, but other attachment means may be used. For instance, automatically detonated explosive bolts could be used. The sound source may also be attached to the fin of a rocket motor which is known to shear from the rocket upon impact with the water, or it may be placed internally on a part such as the rocket nozzle which is also known to separate from the rest of the rocket upon impact with the water. Thus, the sound source may be located on various parts and in different places as long as separation from the main mobile device takes place before, on, or after submerging.

A length of flexible line is coiled within a line housing coupled to the mounting bracket such that the line will freely feed out from the housing when pulled by one free end thereof, which free end is adapted for coupling with the device, the other end being coupled with the sound source and its bracket. This allows ejection of the bracket with the sound source, while maintaining a flexible connection between the mobile device and the sound source. Where the device or object is airborne, such as a rocket or missile, an aerodynamic fairing for the bracket is adapted to separate from the bracket, exposing the blunt surfaces of the bracket such that there will be a substantial drag on the sound source assembly to insure that it separates substantially from the object or device after impact with the water. During recovery, the sound source will lead a diver to the general area, where he will locate the sound source and be led to the device by the flexible line. If visibility conditions are such that difficulty is encountered in pinpointing the sound source, the diver may maneuver in a set pattern over the area until he encounters the line connecting the sound source and the object to be recovered. Thus, even though visibility conditions may be extremely poor, precluding a direct sighting of any object, the extended line enhances the recovery capability through dragging methods.

Other and further objects, advantages and features of my invention will become apparent to those skilled in the art from the ensuing description of a preferred embodiment for use in connection with the location and recovery of spent rocket motors, which usually bury in the ocean floor upon impact, taken in conjunction with the accompanying drawings.

DESCRIPTION OF THE PREFERRED EMBODIMENT

Figure 1:
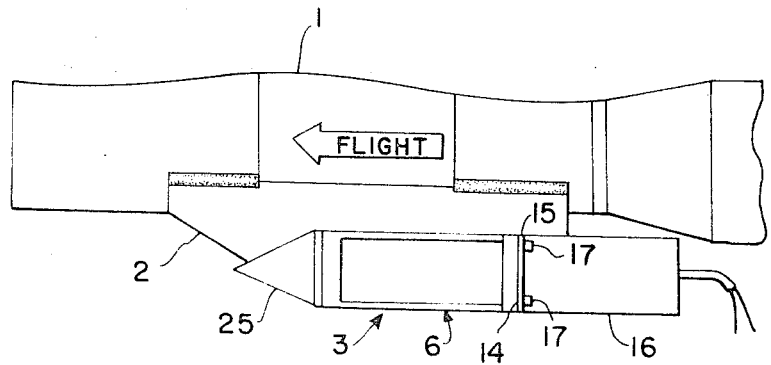
FIG. 1 is a somewhat diagramatic elevation view of a rocket motor with a preferred embodiment of my invention mounted on the aft launch shoe.
Figure 2:
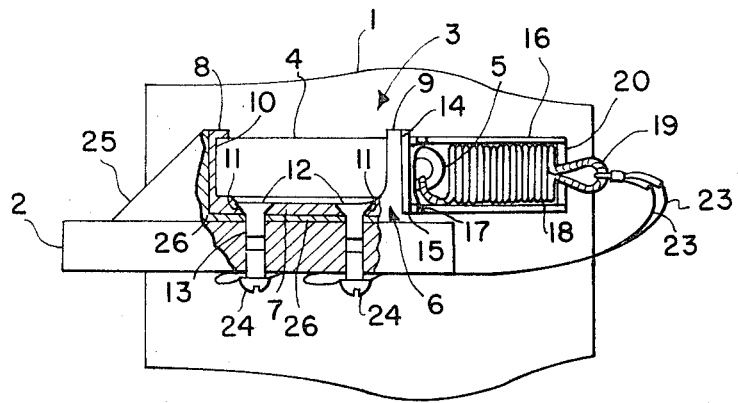
FIG. 2 is a bottom plan view of the assembly of FIG. 1 showing more details of the ejectable underwater sound source assembly itself and its manner of connection to the aft launch shoe.
Figure 3:
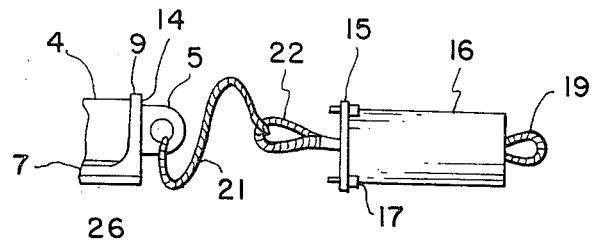
FIG. 3 is a fragmentary illustration showing the manner in which the line housing, the line, the mounting bracket, and the sound source are assembled.

Referring to the drawings, reference character 1 designates a conventional rocket motor, for instance, an "Honest John" rocket motor of a well-known type, provided with an aft launch shoe 2. An ejectable underwater sound source recovery assembly in accordance with a preferred embodiment of my invention is designated generally by reference character 3. Assembly 3 includes an underwater sound source 4, which may be considered as a conventional sound source modified by the addition of an attachment point 5. An exemplary sound source is model N15A210, manufactured by Dukane Corporation, St. Charles, Illinois. The body of sound source 4 is generally cylindrical, and attachment point 5 may form part of the case cover at the battery end. The general type of sound source is often referred to as a pinger.

The mount or bracket for the pinger or sound source is shown generally at 6, and comprises an elongate body member 7 formed with two brackets 8 and 9 standing proud from body member 7. A blind ended bore 10 in bracket 8 receives one end of pinger 4. Elongate body member 7 is formed with bolt holes 11 to receive mounting bolts 12 for connecting the assembly to the launch shoe 2. In this embodiment, mounting bolts 12 are designed to fracture upon impact with the water, and thus are formed with necked-down sections 13 which will rupture under a predetermined force. A pinger or source retainer 14 comprises a thin metal bulkhead through which attachment point 5 passes, this retainer 14 being located between the faces of bracket 9 and mounting flange 15 of line housing 16. The bulkhead serves as a retainer to hold the line 22 in the housing 16 before final assembly, and prevents the line from interfering with the mating surfaces during assembly. Mounting bolts 17 connect mounting flange 15 and line housing 16 to bracket 9 of pinger mount 6. Coiled within line housing 16 is a length of line 18, which may comprise 20 to 30 feet of 550 pound test parachute riser line. Line 18 has an outer looped end 19 which extends through a pull-out disc 20, loop 19 preferably being made by forming a loop around a conventional thimble. Pullout disc 20 is designed so as to maintain the line 18 and loop 19 in place under normal conditions, but to release the loop and line under a predetermined force so as to permit the line to play out freely from the line housing.

A wire rope 21, which may be approximately three feet long, connects inner loop end 22 of line 18 with attachment point 5 of pinger 4. A connecting cable 23 connects loop 19 of line 18 with self-locking screws 24 on launch shoe 2 to complete the flexible connection between attachment point 5 and launch shoe 2.

An aerodynamic fairing 25 is located at the forward end of pinger mount 6 adjacent the forward face of bracket 8, and includes a flat member 26 extending under mount 6. Screws 12, passing through member 26, constitute the only connection holding fairing 25 and pinger mount 6 on the launch shoe, and thus it will be readily apparent that fairing 25 will separate from the assembly 3 when assembly 3 separates from launch shoe 2 upon rupture of mounting screws 12.

When assembled, pinger 4 is firmly suspended over elongate body member 7 by the blind ended bore 10 at one end and a corresponding through-opening in bracket member 9 at the other end. When mounting the assembly there should be minimum slack in connecting cable 23 so as to avoid any possibility of snagging on projections.

Although mounting bolts adapted to rupture upon impact have been used in the illustrated preferred embodiment, it will be understood that explosive bolts could be used, adapted to detonate at a predetermined time, or at a predetermined altitude, or upon termination of rocket motor thrust.

In use of the preferred embodiment, when the rocket motor impacts the water the bracket separates from the motor because of the rupture of the mounting bolts. The nylon cord remains attached to the motor, and is fed out of the line housing as the motor and bracket separate. The aerodynamic fairing separates from the bracket when the bracket separates from the motor, thus producing a drag configuration that prevents the assembly from burying beneath the ocean floor.

The underwater sound source or attached cord is located by the diver as previously described, and the attached cord leads to the buried motor.

It is to be understood that the foregoing illustrated and described embodiment is exemplary of my invention, and is not limiting of it. The scope of the invention is as defined in the subjoined claims, taken in conjunction with the previous description and illustrations.

I claim:

1. For ejectable mounting in or on a mobile device intended to travel over water to facilitate location and recovery of at least a portion of the device when submerged, an underwater sound source assembly comprising an underwater sound source, a mounting bracket firmly containing said sound source, a line housing coupled to said mounting bracket, a length of flexible line coiled within said line housing such that the line will freely play out from the line housing when pulled by one free end thereof, said line having one fixed end coupled with said assembly and one free end terminating in a connector accessible from outside said line housing to permit ready connection of said free end with a mobile device in or on which the assembly is to be mounted, means for normally retaining said line in said line housing and releasing said line only in response to a predetermined pulling force on said free end, and coupling means adapted to firmly couple said assembly to a mobile device such that said assembly will release therefrom in response to a predetermined condition, leaving the assembly connected to the device only by said line.

2. An assembly as claimed in claim 1 wherein said coupling means comprise bolt means for rupturing under a predetermined force.

3. An assembly as claimed in claim 1 further comprising an aerodynamic fairing at one end of said assembly and coupled thereto to release therefrom when said assembly releases from a mobile device in or on which it is ejectably mounted.

4. An assembly as claimed in claim 3 wherein said aerodynamic fairing is coupled to said assembly by said coupling means.

5. An assembly as claimed in claim 4 wherein said one end of said assembly is relatively blunt, wherein said assembly has a mounting face to lie against a surface of the device in or on which it is mounted, and wherein said aerodynamic fairing includes a portion adapted to extend along said mounting face to be embraced firmly between said mounting face and said surface.

6. An assembly as claimed in claim 1 wherein said mounting bracket includes an elongate body member with two bracket members standing proud therefrom at opposite ends thereof, means on the inner face of one of said bracket members for insertably receiving and supporting one end of said sound source, a through-opening in the other of said bracket members through which said sound source can be longitudinally inserted and removed, said through-opening supporting the other end of said sound source, and wherein said line housing is removably connected to the outer face of said other bracket member to cover said through-bore.

7. An assembly as claimed in claim 6 wherein said sound source has a line attachment face at its said other end projecting from said through-bore into said line housing and wherein said fixed end of said line is coupled to said attachment point.

8. An assembly as claimed in claim 6 wherein said sound source is suspended clear of said elongate body member between said two bracket members.

9. An assembly as claimed in claim 8 in combination with an aeronautical device and coupled thereto by said coupling means and said free end connector of said line, said coupling means comprising connectors for automatically releasing upon impact of the aeronautical device with a body of water over which the device has flown.

10. An assembly as claimed in claim 1 in combination with an over-water-travelling device and coupled thereto by said coupling means and said free end connector, said coupling means comprising connectors releasable automatically upon occurrence of a predetermined condition.

11. An assembly as claimed in claim 1 in combination with an aeronautical device and coupled by said coupling means to a part thereof which will separate from the device upon occurrence of a predetermined condition, said free end connector of said line being connected to another part of said device.

* * * * *